United States Patent Office 3,315,262
Patented Apr. 18, 1967

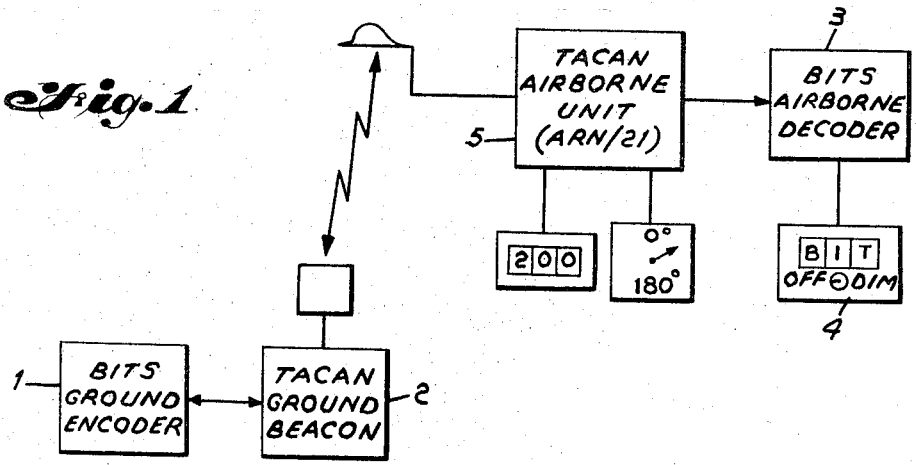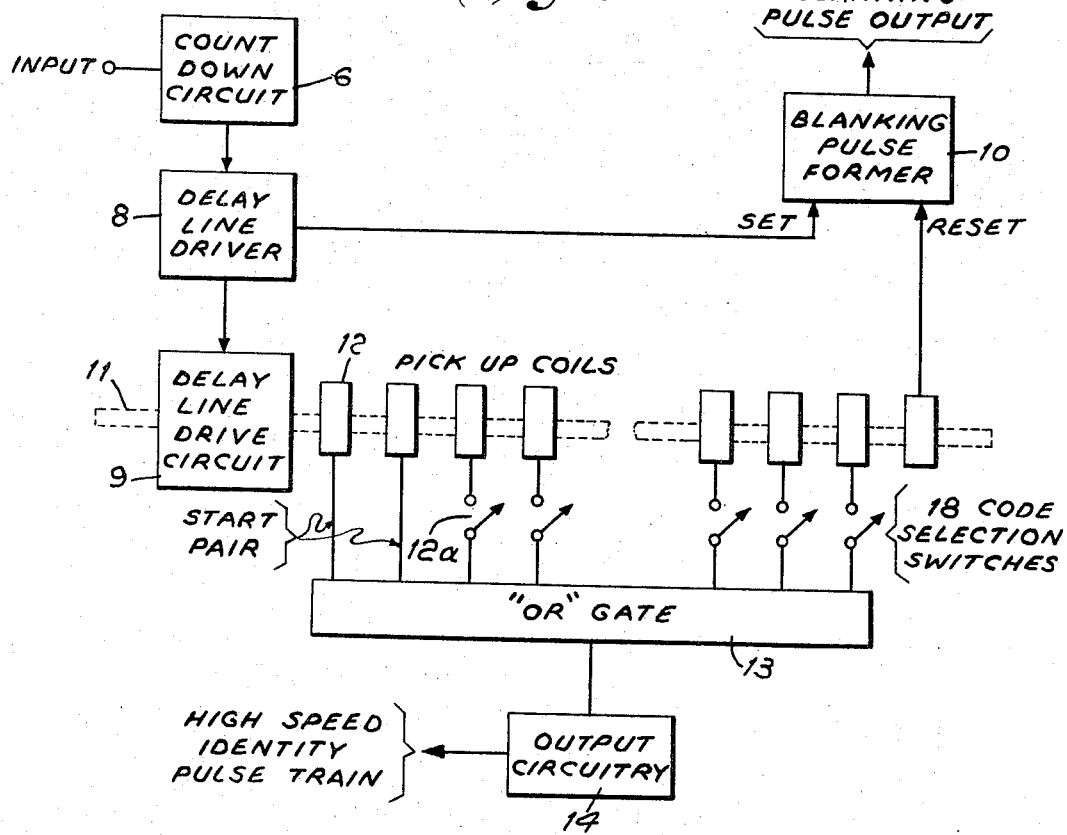

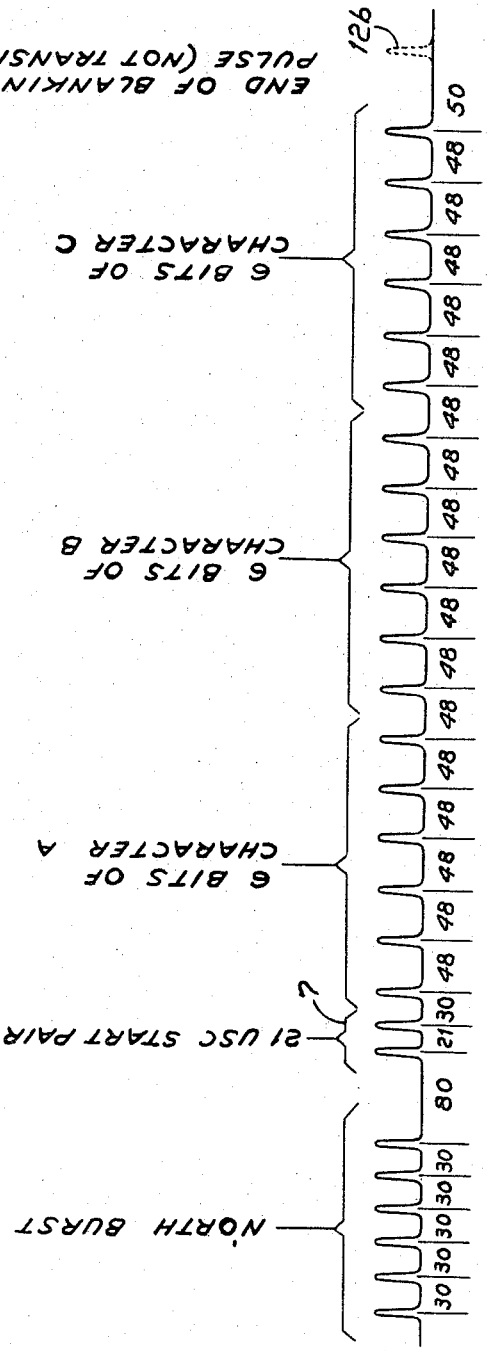

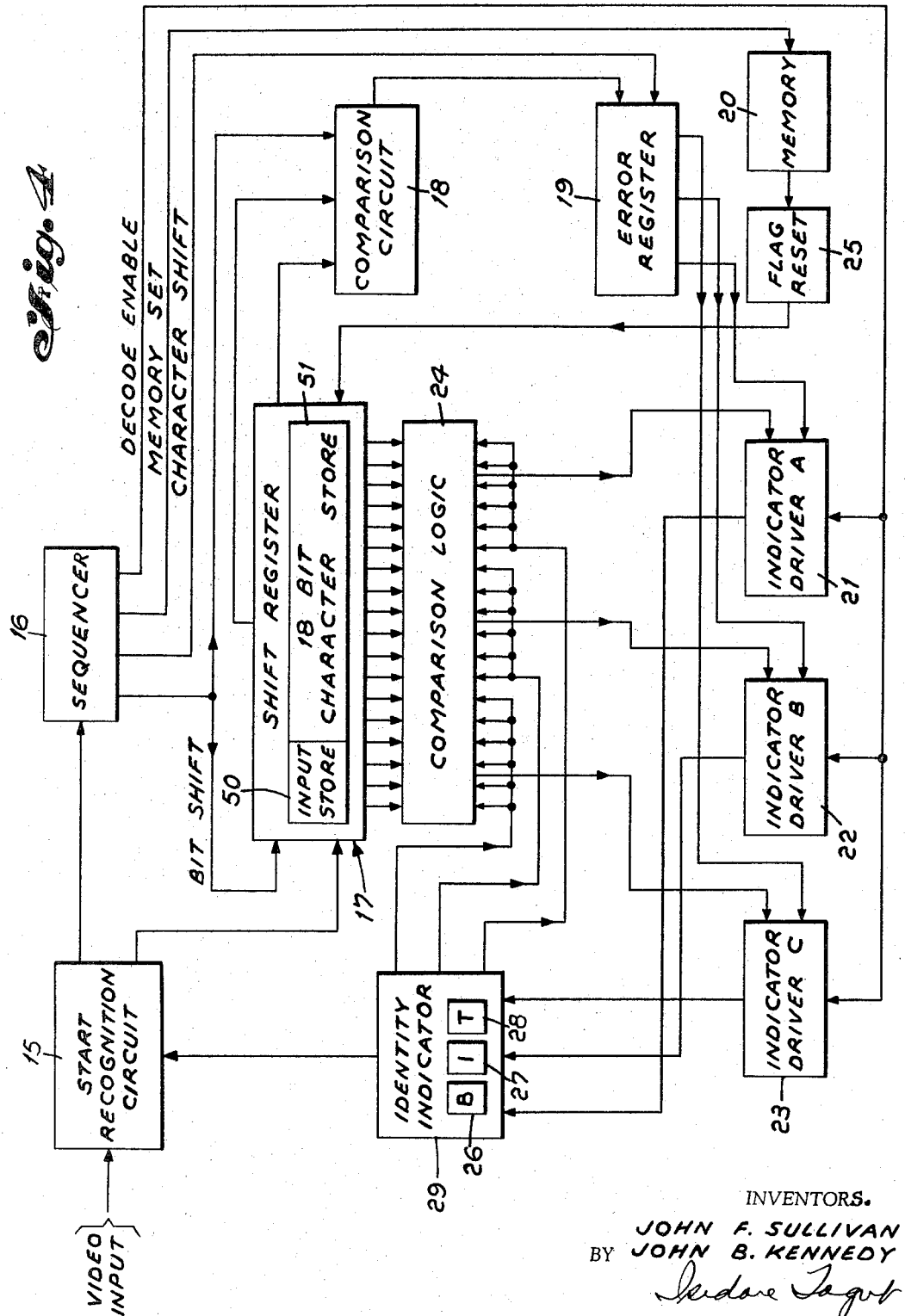

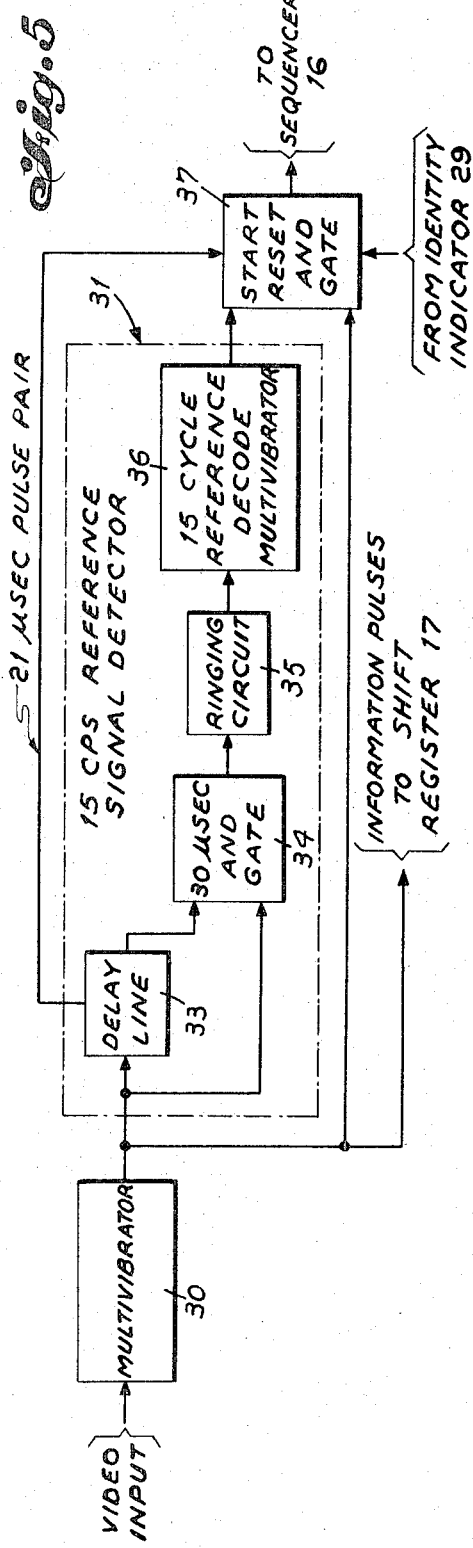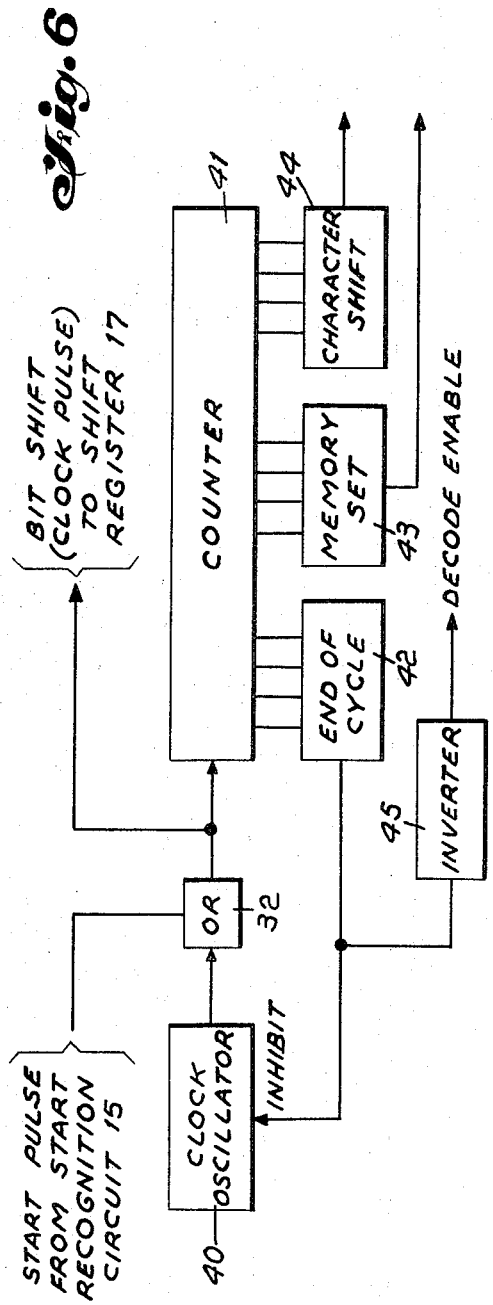

3,315,262
BEACON IDENTITY DISPLAY
John F. Sullivan, Wellesley, Mass., and John B. Kennedy, Montville, N.J., assignors to International Telephone and Telegraph Corporation, Nutley, N.J., a corporation of Maryland
Filed May 18, 1964, Ser. No. 368,240
12 Claims. (Cl. 343—106)

This invention relates to a radio navigation system of the type in which a radio beacon periodically emits identifying signals.

In certain radio navigation systems, such as Tacan, bearing information and distance information are provided by a beacon station which radiates pulses according to a rotating multilobe directional pattern. Each time a lobe of this pattern passes a given reference point, a reference signal is emitted. The rotation of the antenna pattern, in effect, amplitude modulates the pulses to provide an amplitude envelope thereon. The phase of this envelope with respect to the reference signal varies at different azimuthal angles from the beacon. In the receiver receiving these pulses from the beacon station, this envelope is separated from the pulses by a filter and the phase of this envelope is compared with the phase of the reference signal to give the bearing indication. The distance data is derived by electrically measuring the net time elapsing between transmission of an interrogation pulse pair and receipt of a reply pulse pair from the surface beacon. This time interval is directly proportional to the line-of-sight distance between the aircraft and the beacon.

In the Tacan system, the usual pulses produced are semi-random in nature, that is, there are approximately 2700 pulses per second but the pulse positions are not fixed. These semi-random pulses are encoded by sending a pair of pulses for each one of the semi-random pulses with a fixed spacing between the pulses of each pair. Heretofore it has been the practice in the Tacan system to also produce an identifying signal of 2700 pulses per second, but grouped in a 1350 c.p.s. repetitive pattern. These pulses have fixed regular spacing and are used at the receiver to ring a ringing circuit and produce a tone which is keyed at the beacon in accordance with a Morse code identifying that beacon station. The identity code group is transmitted once each 37.5 seconds.

The difficulty with this system is that with the vastly increased speed of aircraft, particularly jet aircraft, today the identity tone signals are not transmitted fast enough to provide the pilot of the aircraft with quick identification of the beacon since he must wait 37.5 seconds before the identity tone group is transmitted from the beacon. Also, the pilot must rely on the aural tone signal for identification of the beacon. This presents a hindrance to the pilot in the performance of his usual duties.

An object of the present invention is the provision of an improved radio navigation system providing identifying signals.

Another object of the present invention is the provision in the radio navigation system of identifying signals which provide increased accuracy and are transmitted at a high rate of speed.

A further object is the provision in the airborne receiver of means to visually display the beacon identity.

A feature of this invention is that the beacon transmits three character identification signals in digital form at least once every second and the aircraft receiver receives and detects these high-speed character identification signals and responsive to the detection of the character identification signals, provides a visual display of the beacon identification characters in the aircraft.

Other and further objects of the present invention will become apparent and the foregoing will be better understood with reference to the following description of an embodiment thereof, reference being had to the drawings, in which:

FIGURE 1 is a system block diagram of a Tacan-type beacon transmitter and mobile receiver;
FIGURE 2 is a block diagram of the ground encoder;
FIGURE 3 is a timing diagram for the beacon encoder;
FIGURE 4 is a block diagram of the airborne decoder;
FIGURE 5 is a block diagram of the start recognition circuit; and
FIGURE 6 is a block diagram of the sequencer circuit.

Referring now to FIGURE 1, the beacon identity transmission system (BITS) is composed of a ground encoder unit 1 which feeds the ground Tacan beacon 2, an airborne decoder unit 3, and a display unit 4, which are fed from the airborne Tacan receiver 5. The identity information is transmitted in the one millisecond period following a main (north) bearing reference group. The transmission rate is normally once per second; it can be increased to a maximum of 15 per second (the north burst rate) if desired. The one millisecond transmission is divided into three parts, one for each of the identity characters, and each part contains from zero to six pulses depending on the particular character code being transmitted. The all zeros code, the all ones code and 38 other codes are reserved for numeric and other special characters. The 26 alphabetic codes, therefore, involve at least one pulse but no more than four pulses-per-character. During the one millisecond identity transmission, the Tacan DME service is interrupted.

With reference to FIGURE 2, the ground encoder 1 for the beacon identity transmission system generates the high-speed identity transmission and a blanking pulse. The ground encoder generates the high-speed identity transmissions in synchronism with the Tacan 15 c.p.s. bearing reference signal at a counted down rate. The ground encoder detects the end of the 15 c.p.s. bearing reference signal counted down in the countdown circuit 6 and then generates a blanking pulse and the high-speed identity transmission. The blanking pulse is used to blank the Tacan DME and squitter (random pulse generator) in the Tacan ground transmitter. This allows the high-speed identity pulse train to be transmitted without interference. The blanking pulse is approximately one millisecond long or slightly longer than the time required for a high-speed identiy transmission. This is shown in FIGURE 3. The high-speed identity transmission consists of a 21 microsecond start pulse pair 7 which follows the north burst that consists of six pulses spaced 30 microseconds apart. The 21 microsecond start pulse pair is followed by 18 time slots. Each time slot is 30 microseconds in duration, spaced 48 microseconds apart and may contain a pulse depending upon the code for the identity of a particular beacon. The trailing edge of the 15 c.p.s. reference blanking pulse from the Tacan ground unit is used as the input to the countdown circuit 6 to trigger a Shockley diode countdown circuit. Once the diode fires, it takes a specific time for the bias to build up to the point where the diode will fire again. In this ground encoder, a control (not shown) is supplied which sets the firing rate to 10/second, 1/second (normal) or 0.5/second as may be desired. The countdown circuit 6 sends a trigger, which is in synchronism with the 15 c.p.s. reference bearing signal, to the delay line driver 8. The delay driver 8 is a silicon controlled rectifier which, when triggered, pulses the delay line drive circuit 9 of a magnetostrictive delay line and a blanking pulse former 10 having silicon controlled rectifier flip-flop (not shown) which generates the blanking pulse that is used to blank the DME and squitter generator in the Tacan ground beacon during identity transmission. The delay line drive circuit energy is imparted to a 200 inch nickel ribbon delay line 11. Pickup coils 12 detect the pulse energy after it has been delayed by traveling along the nickel ribbon 11 shown in broken line. There are 21 such pickup coils in the ground encoder. The first two coils are placed approximately 80 μsec. down the line after the last pulse of the north burst pulse signals and 21 microseconds apart. These two pickups form the 21 microsecond start pulse pair. The next pickup is an additional 30 microseconds down the line and is followed by 17 more pickups placed 48 microseconds apart. These 18 pickups form the 18 bits of information needed for the three characters in the identity. Each one of these pickups can be switched in or out of the circuit by switches 12a, depending upon the code desired. The final pickup coil is 50 microseconds from the last information pickup coil. After being amplified, the last pulse 12b (which is not transmitted) is used to turn off the silicon controlled rectifier flip-flop in the blanking pulse former 10. The outputs from the selected pickups are fed to an OR gate 13 and thence to the output circuitry 14 where they are mixed and amplified in a three-stage transistor amplifier along with the 21 microsecond start pulse pair. The pulse train output of the ground encoder is then used to trigger the Tacan ground beacon 2 for transmission to the airborne decoder 3. The airborne decoder 3 accepts the high-speed identity information only when the Tacan 15 cycle reference bearing signal, which consists of the 12 pulse pairs spaced 30 microseconds apart, is followed within a 100 microsecond period by a 21 microsecond pulse pair. The airborne decoder consists of a start recognition circuit 15, the output of which is coupled to a sequencer 16 and a shift register 17. The sequencer 16 is coupled to a comparison circuit 18, an error register 19, a memory 20 and driver indicators 21, 22 and 23. The output of the shift register 17 is coupled to the comparison circuit 18 and to a comparison logic 24. The output of the comparison logic 24 is coupled to the indicator drivers 21, 22 and 23. The output of the memory 20 is coupled to a flag reset 25, the output of which is coupled back to the shift register 17. The indicator drivers 21, 22 and 23 are coupled to respective indicators 26, 27 and 28 of an identity indicator 29 for displaying the beacon identity characters. An example of an identity indicator is three Celluloid tapes each of which bears the 64 alpha-numeric characters and special symbols. The tapes are mounted on motor driven sprocket wheels which contain segmented printed circuitry so that the discreet tape position can be determined by a set of brushes which wipe the coded sprocket wheels. When valid information is stored in the decoder unit and the indicator is enabled, the motor moves the tape until the code exhibited by the set of brushes in the indicator identically matches the code stored in the storage shift register. Diode logic recognizes the comparison and disables the motor. The tape bearing sprocket wheels are then braked and the tape is adjusted by a detent to the proper discreet position.

The start recognition circuit 15, which will now be described with reference to FIG. 5, decodes the 15 cycle reference bearing signal and then looks for a 21 microsecond pulse pair. When this condition is satisfied, the start recognition circuit generates a start reset pulse and identity information is then accepted. The output of the start recognition circuit 15 is a start reset pulse which is fed to the sequencer 16 and the information pulses which are fed to the shift register 17. With reference to FIG. 5, the decoded video pulse output from the Tacan airborne unit is used to trigger an input multivibrator 30 in the Start Recognition Circuit. The input multivibrator 30 feeds a 15 cycle reference signal detector 31 which includes a 21 μsec. pulse pair decoder. The 15 cycle reference signal detector consists of a folded delay line 33, 30 μsec. AND gate 34, a ringing circuit 35 tuned to 33 kc. and a 15 cycle decode multivibrator 36. The 15 c.p.s. reference signal is a train of 12 pulses spaced 30 μsec. apart. The delay line 33 and the 30 μsec. AND gate 34 are used to decode 30 μsec. pulse pairs. When the 15 c.p.s. reference signal occurs the output of the 30 μsec. AND gate 34 is a train of 11 pulses spaced 30 μsec. apart. The ringing circuit 35 is fed from the 30 μsec. AND gate. Since the circuit 35 is tuned to 33 kc., the 30 μsec. pulse spacing will cause the tank circuit to ring in increasing amplitude until a threshold is overcome. When the threshold is overcome the multivibrator 36 is triggered which signifies a 15 c.p.s. reference decode. The 15 c.p.s. reference decode multivibrator holds the unstable condition for 300 μsec.

The 21 μsec. start pulse pair is detected by using the input to the delay line 33 and a tap in the delay line at 21 μsec. as two inputs to a start reset AND gate 37. The start reset AND gate's two other inputs are the 15 c.p.s. reference decode multivibrator output and a line from the indicator 29. The indicator line inhibits the start reset AND gate when any one of the indicators is running. With no indicators running and a 21 μsec. pulse pair occurring approximately 100 μsec. after a detected 15 c.p.s. reference signal, a start reset pulse is generated. High speed identity information is then accepted.

The sequencer 16, an example of which is shown in FIG. 6, is a five bit binary counter with the gating needed to provide the necessary control and timing pulses. The start pulse output from the start recognition circuit 15 is fed into an OR gate 32. A clock oscillator 40 generates clock pulses which are also coupled to the OR gate 32. The output of the OR gate 32 is a bit shift pulse which is fed to the shift register 17 and to a counter 41 in the sequencer circuit. The output of the counter is fed into three count recognition logic circuits, end of cycle 42, memory set 43, and character shift 44 which are fed respectively to an inverter 45, the memory 20, and the error register 19. The output of the end of cycle 42 is also coupled to the clock oscillator 40 and will inhibit the clock when a given one of the states of the counter 41 will occur. The counter will remain in that state until another start pulse changes the state and the counter then completes the cycle back to turn off. During the cycle bit shift pulses are transmitted. The three circuits 42, 43 and 44 include a plurality of gates whose function is to recognize a specific input. This type of gating circuitry is well known in the art and a more detailed explanation thereof is deemed unnecessary herein.

The shift register 17 accepts and stores the high-speed identity information from the Start Recognition Circuit 15. An example of a shift register suitable in this system is shown in the publication "Handbook of Automation And Control," vol. 2 on page 18–05 to 18–07, published by John Wiley & Sons, Inc., London, 1959.

The information pulses from the start recognition circuit 15 feeds the first flip-flop in the 19 stage shift register 17. The first stage is called the input storage 50. Next follows the character store 51 of 18 bits. There are 3 letters to the identity, each with 6 bits of information. The 3 letters shall be called Character A, B, and C, in the order of their transmission. The information for the first bit of Character A is fed into the input storage 50. Then a bit shift pulse, from sequencer 16, shifts the information into the first stage of the character store 51. The information for the second bit is fed into the input storage 50. The second bit shift pulse shifts the second bit of Character A into the first stage of the character store, and the first bit of Character A into the second stage of the character store. After two bit shift pulses two bits of information are in the character store. This process continues until the 18 bit shift pulses shift the information into the 18 stages of the character store. If the previous high-speed identity message was the same, the indicators will display the information, the beacon's identity.

Before the high-speed identity is displayed there must be two consecutive messages exactly the same. The comparison circuit 18 compares the last or 18th stage of the character store 51 with the input storage 50. The 18th stage of the character store has the information for the first bit of Character A. When the second message begins, the input storage has the information for the first bit of Character A of the second message. If the two messages are to be exactly the same, the information in the input storage and 18th stage of the character store should be the same. The comparison circuit 18 checks each bit of information in the second message as it is shifted in and compares it with the corresponding bit in the first message. If there are any differences between corresponding bits in the two messages, the comparison circuit sends an error set pulse to the error register for each bit that differs.

The purpose of the error register 19 is to store the errors in the message by characters and the characters in which the errors occur are not displayed. The error register is a three-bit shift register, one bit for each of the three characters. As an error from each character occurs, the character shift pulses from the sequencer 15 shifts the error to the corresponding bit in the error register. If bit A in the error register has an error, it will inhibit that character in the character store on being displayed. Hence, a character that is identically repeated in two consecutive messages will be displayed. The error checking can be changed to require all three characters to simultaneously have no errors before any of the identity message will be displayed. The comparison logic 24, an example of which suitable for use in this system is shown in the publication "Computer Logic" by Ivan Flores, pages 190–192, published by Prentice Hall, Inc., 1960, compares the information in the character store 51 in the shift register 17 with that being displayed by the identity indicator 29. If the character store 51 and the identity indicator 29 do not have the same information, comparison logic provides the necessary output to the indicator drivers 21, 22 and 23 to operate the indicators 26, 27, and 28 until the correct identity character is displayed.

The comparison logic 24 consists of diode gates which compare each bit in the character store 51 to a corresponding data line from the identity indicator 29. There are six data lines from each of the 3 identity indicators, one data lne for each bit of the six bits of information to an identity character. The six bit binary code for each character is placed on the data lines by six brushes which detect the position of two code wheels in the identity indicator. The code wheels direct drive the tape which has the identity characters on it. The tape position is directly related to the code wheel position, hence, the proper code appears on the six data lines for each identity character as it is being displayed.

The indicator drivers 21, 22 and 23 accept the output from the comparison logic 24 and, if not inhibited by the error register 19 or the decode enable output of the sequencer 16, will cause the indicators in the identity indicator 29 to operate until the comparison logic reaches comparison. There are three indicator drivers, one for each character in the identity indicator 29. Each indicator driver converts the comparison logic output into a signal sutable for energizing a relay coil. When the relay coil is energized, the relay contacts supply voltage to the motor in the indicator of the identity indicator 29. The motor drives a tape with the identity characters via the code wheel. When the correct character is displayed, the comparison logic turns off the indicator driver which in turn deenergizes the relay coil. The relay contacts open and the motor stops with the correct character being displayed. The error register 19 inhibits so that only characters that have been twice stored without error are displayed. The decode enable signal inhibits the indicators from running while a message is being decoded.

The Flag Reset circuit 25 erases stale information, and causes the indicators to display a white dot on a black background. There are two methods for determining if information is stale. The first method determines if there have been any messages during the last 40 to 80 seconds and if no messages have been decoded, a memory circuit will reset the indicator to flag position. The second method depends upon the status of the bearing and DME. Once the identity is validly displayed and DME or bearing remain in lock-on, the identity will remain displayed even if no messages are received for the 40 to 80 sec. period. As long as either bearing or distance remain in lock the identity will be displayed. As soon as both bearing and distance go into search the indicator will be reset to flag position. The second method provides visual identity as long as one of the Tacan services are providing information.

While we have described above the principles of our invention in connection with specific apparatus, it is to be clearly understood that this description is made only by way of example and not as a limitation to the scope of our invention as set forth in the objects thereof and in the accompanying claims.

We claim:

1. In a navigation system including a beacon transmitting pulse signals and a reference signal burst and cooperating apparatus carried by aircraft responsive to the signals transmitted by the beacon comprising at the beacon: means responsive to the termination of the reference signal burst to generate a blanking pulse and a trigger pulse, delay means responsive to the trigger pulse to produce recognition pulses and character information pulses for the identification of said beacon to the aircraft, means to transmit said recognition and information pulses, and comprising on the aircraft: means to detect the reference signal burst, means to detect the recognition pulses and the information pulses, means to generate a start reset pulse responsive to the recognition pulses, a sequencer circuit, means to couple said start reset pulse to said sequencer circuit, means to produce as one of the outputs of said sequencer circuit a bit shift pulse, a shift register, means coupling the information pulses from said start recognition circuit and the shift pulses from said sequencer circuit to said shift register whereby said shift register stores identity information pulses from said start recognition circuit, a comparison circuit, means coupling the output of said shift register and said shift pulses to said comparison circuit whereby on the coincidence of two consecutive messages the information in the shift register is transmitted to a comparison logic circuit, an identity indicator having a visual display indication for each character of said beacon identification, a plurality of indicator driver circuits equal to the number of character display indicators, means coupling the output of said comparison logic circuit to said indicator driver circuits, means coupling the output of each said indicator driver circuit to a corresponding one of said visual display indicators, means coupling a signal output indicative of each character of the identity indicators to said comparison logic whereby the information in the shift register is compared with the information displayed by the identity indicators, an error circuit, means coupling the output of said comparison circuit to said error circuit whereby on the appearance of an error in any of said character information pulses said error circuit produces an inhibiting signal to inhibit the identity indicator and means responsive to a memory circuit to erase unrequired information from said identity indicators.

2. In a navigation system including a beacon transmitting pulse signals and a reference signal burst and cooperating apparatus carried by aircraft responsive to the signals transmitted by the beacon comprising at the beacon: means responsive to the termination of the reference signal burst to generate a blanking pulse and a trigger pulse, delay means responsive to the trigger pulse to produce recognition pulses and character information pulses for the identification of said beacon to the aircraft, means to transmit said recognition and information pulses, and comprising on the aircraft: means to detect the reference signal burst, means to detect the recognition pulses and the information pulses, a start recognition circuit, means coupling said received recognition and information pulses to said start recognition circuit, a sequencer circuit, means to couple said start recognition circuit to said sequencer circuit, a shift register, means coupling said sequencer and said start recognition circuit to said shift register to store identity information pulses in said shift register, a comparison circuit, a comparison logic circuit, means coupling the output of said shift register and said sequencer to said comparison circuit whereby on the coincidence of two consecutive messages the information in the shift register is transmitted to said comparison logic circuit, an identity indicator having a visual display indication for each character of said beacon identification, a plurality of indicator driver circuits equal to the number of character display indicators, means coupling the output of said comparison logic circuit to said indicator driver circuits, means coupling the output of each said indicator driver circuit to a corresponding one of said visual display indicators, means coupling a signal output indicative of each character of the identity indicators to said comparison logic whereby the information in the shift register is compared with the information displayed by the identity indicators, an error circuit, means coupling the output of said comparison circuit to said error circuit whereby on the appearance of an error in any of said character pulses said error circuit produces an inhibiting signal to inhibit the identity indicator and means responsive to a memory circuit to erase unrequired information from said identity indicators.

3. In a navigation system according to claim 2 wherein said information pulses comprise three groups of pulses, each said group representing one character of the beacon identification.

4. In a navigation system according to claim 2 wherein said delay includes a plurality of pickoff coils spaced apart along said delay means, a plurality of switches, an OR gate, each said switch connecting one of said pickoff coils to said OR gate whereby each said switch may be coupled to a corresponding coil in accordance with a predetermined code.

5. In a navigation system according to claim 2 wherein said start recognition circuit comprises delay means and a ringing circuit coupled thereto to detect the reference signal burst and produce as an output of said circuit a start pulse.

6. In a navigation system according to claim 2 wherein said sequencer circuit comprises a clock, an OR gate, means coupling the output of said clock and said start pulse to said OR gate, a counter, means coupling the output of said OR gate to said counter, a plurality of AND gates and means coupling the output of said counter to said AND gates.

7. In a navigation system including a beacon transmitting pulse signals and a reference signal burst and cooperating apparatus carried by aircraft responsive to the signals transmitted by said beacon comprising at the beacon: means for generating a blanking pulse at a predetermined time after said reference signal burst to inhibit the normally transmitted pulses from said beacon for the duration of said blanking pulse, means responsive to said blanking pulse to produce information pulses for the identification of said beacon to said aircraft and means to transmit said information pulses, the apparatus on said aircraft comprising: means to detect the reference signal burst, means to detect the information pulses, means responsive to the detection of said pulses to decode said information pulses and means coupled to said decoder for providing a read-out of the beacon idenification.

8. In a navigation system according to claim 7 wherein said information pulses include recognition pulses and character information pulses, said apparatus on said aircraft further comprising: a start recognition circuit for generating a start reset pulse responsive to the recognition pulses and a sequencer circuit coupled to said start recognition circuit, and wherein said decoding means includes: a shift register coupled to said start recognition circuit and to said sequencer, means coupling the character information pulses from said start recognition circuit and the shift pulses from said sequencer circuit to said shift register whereby said shift register stores identity information pulses from said start recognition circuit and indicator means coupled to said shift register for providing a visual display of the identity of said beacon.

9. In a navigation system according to claim 8 further comprising comparison logic means coupling said indicator to said shift register, said comparison logic means comparing the present and last previous beacon identity characters and causing said indicator means to indicate the present characters when there is a discrepancy in said comparison.

10. In a navigation system according to claim 7, said information pulses comprising three groups of pulses, each said group representing one character of the beacon identification.

11. In a navigation system according to claim 8, said start recognition circuit comprising delay means and a reading circuit coupled thereto to detect the reference signal burst and produce as an output of said circuit a start pulse.

12. In a navigation system according to claim 9, said sequencer circuit comprising a clock, an OR gate, means coupling the output of said clock and said start pulse to said OR gate, a counter, means coupling the output of said OR gate to said counter, a plurality of AND gates and means coupling the output of said counter to said AND gates.

References Cited by the Examiner

Altonji, Edmund R., Airborne Tacan Data-Link Equipment AN/ARN–26, in Electrical Communication, volume 34, No. 3, September 1957, pages 228–242 relied on.

CHESTER L. JUSTUS, *Primary Examiner.*

RODNEY D. BENNETT, *Examiner.*

D. C. KAUFMAN, *Assistant Examiner.*